United States Patent
Ichapurapu et al.

(10) Patent No.: US 10,931,324 B1
(45) Date of Patent: Feb. 23, 2021

(54) DYNAMIC SELECTION BETWEEN RECEIVER PATHS TO CONTROL RECEIVER GAIN

(71) Applicant: Amazon Technologies, Inc., Seattle, WA (US)

(72) Inventors: Ravi Ichapurapu, Morgan Hill, CA (US); Basak Oyman, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/851,792

(22) Filed: Apr. 17, 2020

(51) Int. Cl.
*H04B 17/00* (2015.01)
*H04B 1/16* (2006.01)

(52) U.S. Cl.
CPC ..................................... *H04B 1/16* (2013.01)

(58) Field of Classification Search
CPC .................................. H04B 1/16; H04B 17/00
USPC .... 455/67.11, 226.1, 234.1, 230, 522, 127.1, 455/343.1
See application file for complete search history.

(56) References Cited

U.S. PATENT DOCUMENTS

| | | | | |
|---|---|---|---|---|
| 7,031,413 | B2 * | 4/2006 | Doi ...................... | H04B 7/0854 375/285 |
| 7,356,322 | B2 * | 4/2008 | Hammerschmidt ........................ | H03G 3/3078 455/254 |
| 8,031,808 | B2 * | 10/2011 | Hammerschmidt ........................ | H03G 3/3078 375/316 |
| 8,149,971 | B2 * | 4/2012 | Hammerschmidt ........................ | H03G 3/3078 375/349 |
| 8,634,766 | B2 * | 1/2014 | Hobbs .................... | H04B 17/40 455/8 |
| 8,909,133 | B2 * | 12/2014 | Hobbs .................... | H04B 17/21 455/8 |

* cited by examiner

*Primary Examiner* — Sonny Trinh
(74) *Attorney, Agent, or Firm* — Lee & Hayes, P.C.

(57) ABSTRACT

Techniques for a communication device with a receiver to dynamically control the gain of an analog front end of the receiver. Rather than having a single circuit path in the analog front end, the analog front end includes multiple circuit paths, and dynamically selects one of the circuit paths that optimizes the gain of the analog front end. For example, an amplifier circuit path may be selected to amplify the power level of the signal received from the antenna. However, the analog front end may further include an attenuator circuit path that includes an attenuator to reduce the power level of a high-power input signal received from the antenna to ensure that the high-power signal is attenuated below a power level associated with saturation of the receiver.

20 Claims, 6 Drawing Sheets

500

```
┌─────────────────────────────────────────────────────────────┐
│ RECEIVE, USING AN ANTENNA OF A COMPUTING DEVICE, AN ANALOG  │
│                 SIGNAL REPRESENTING A PACKET                │
│                             502                             │
└─────────────────────────────────────────────────────────────┘
                              │
                              ▼
┌─────────────────────────────────────────────────────────────┐
│ CONNECT, BY A SWITCHING COMPONENT, A FIRST INPUT TO AN      │
│ OUTPUT OF THE SWITCHING COMPONENT SUCH THAT A FIRST         │
│ PORTION OF THE ANALOG SIGNAL IS PROVIDED TO A COMPARATOR    │
│ COMPONENT AND RECEIVER CIRCUITRY AT A FIRST POWER LEVEL     │
│                             504                             │
└─────────────────────────────────────────────────────────────┘
                              │
                              ▼
┌─────────────────────────────────────────────────────────────┐
│ CONNECT, BY THE SWITCHING COMPONENT, A SECOND INPUT TO THE  │
│ OUTPUT SUCH THAT A SECOND PORTION OF THE ANALOG SIGNAL IS   │
│ PROVIDED AT A SECOND POWER LEVEL TO THE COMPARATOR          │
│ COMPONENT AND THE RECEIVER CIRCUITRY                        │
│                             506                             │
└─────────────────────────────────────────────────────────────┘
                              │
                              ▼
┌─────────────────────────────────────────────────────────────┐
│ BASED AT LEAST IN PART ON AT LEAST ONE OF THE FIRST POWER   │
│ LEVEL OR THE SECOND POWER LEVEL, PROVIDE A SELECTION SIGNAL │
│ TO THE SWITCHING COMPONENT THAT CAUSES THE SWITCHING        │
│ COMPONENT TO CONNECT THE SECOND INPUT TO THE OUTPUT SUCH    │
│ THAT A THIRD PORTION OF THE ANALOG SIGNAL IS PROVIDED TO    │
│ THE RECEIVER CIRCUITRY                                      │
│                             508                             │
└─────────────────────────────────────────────────────────────┘
```

FIG. 5

DYNAMIC SELECTION BETWEEN RECEIVER PATHS TO CONTROL RECEIVER GAIN

BACKGROUND

Wireless systems have become ubiquitous, and the number of wireless devices, services, and protocols are continuing to grow. The design of a complete radio frequency (RF) receiver is a multidisciplinary design challenge, with the analog front end being a critical part of RF receiver design. In analog receivers, it is critical to have the analog front end have linearity in its dynamic power range. Generally, the design of the RF front end includes determining how much gain is needed for the RF receiver, and specifying components and circuitry between the antenna and mixer stage to achieve the specific gain for a specific signal-to-noise (SNR) ratio. The key parameters of a linear receiver are the receiver's linearity and its dynamic range, where the dynamic range is defined on the lower end by the minimum detectable signal (MDS) and upper end by the saturation threshold of the receiver. Based on the type of receiver and the protocols by which the receiver is going to receive signals, the components of the front end of the RF receiver can generally be selected and designed to achieve desired linearity for the RF receiver.

However, the number of wireless standards continue to grow and gain in popularity. For instance, the original Bluetooth and IEEE 802.11 standards were designed to enable communications in a band around 2.4 gigahertz (GHz). Additional standards continued to emerge, such as the 802.11a and 802.11b extensions to the original 802.11 standard to enable higher data rates. Similar to the original standard, the 802.11a and 802.11b standards communicate data over the 2.4 GHz band. As another example, the ZigBee protocol has emerged which also communicates over the 2.4 GHz band. Thus, many different wireless standards have emerged and are utilized in wireless networks which use the 2.4 GHz band (and/or other overlapping bands, such as 5.0 GHz band).

Wireless platforms and devices continue to advance to allow for greater interconnectivity between devices, such as the Internet-of-Things (IoT). While greater connectivity between wireless devices is advantageous for many reasons, various difficulties may arise when wireless devices attempt to communicate with different devices and using different communication standards. For example, wireless receivers are sensitive to unintentional jamming caused by high-power signals in the communication band of the desired signal being received. For instance, as noted above, a wireless device may be attempting to transmit a signal using the ZigBee protocol in the 2.4 GHz band, while simultaneously attempting to receive a signal using the 802.11 protocol in the 2.4 GHz band. In such an example, if the ZigBee signal is much stronger than the 802.11 signal, then the ZigBee signal will behave as a strong jammer for the receiver and may cause the receiver to saturate. Accordingly, analog front ends that are appropriately designed for linearity under normal operating conditions may suffer from saturation caused by jamming from other high-power signals in the communication band of a desired signal.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example method in which a communication device selects a circuit path, from among multiple circuit paths, in an analog front end for received signals to pass through to optimize receiver gain.

DETAILED DESCRIPTION

Figure 1:
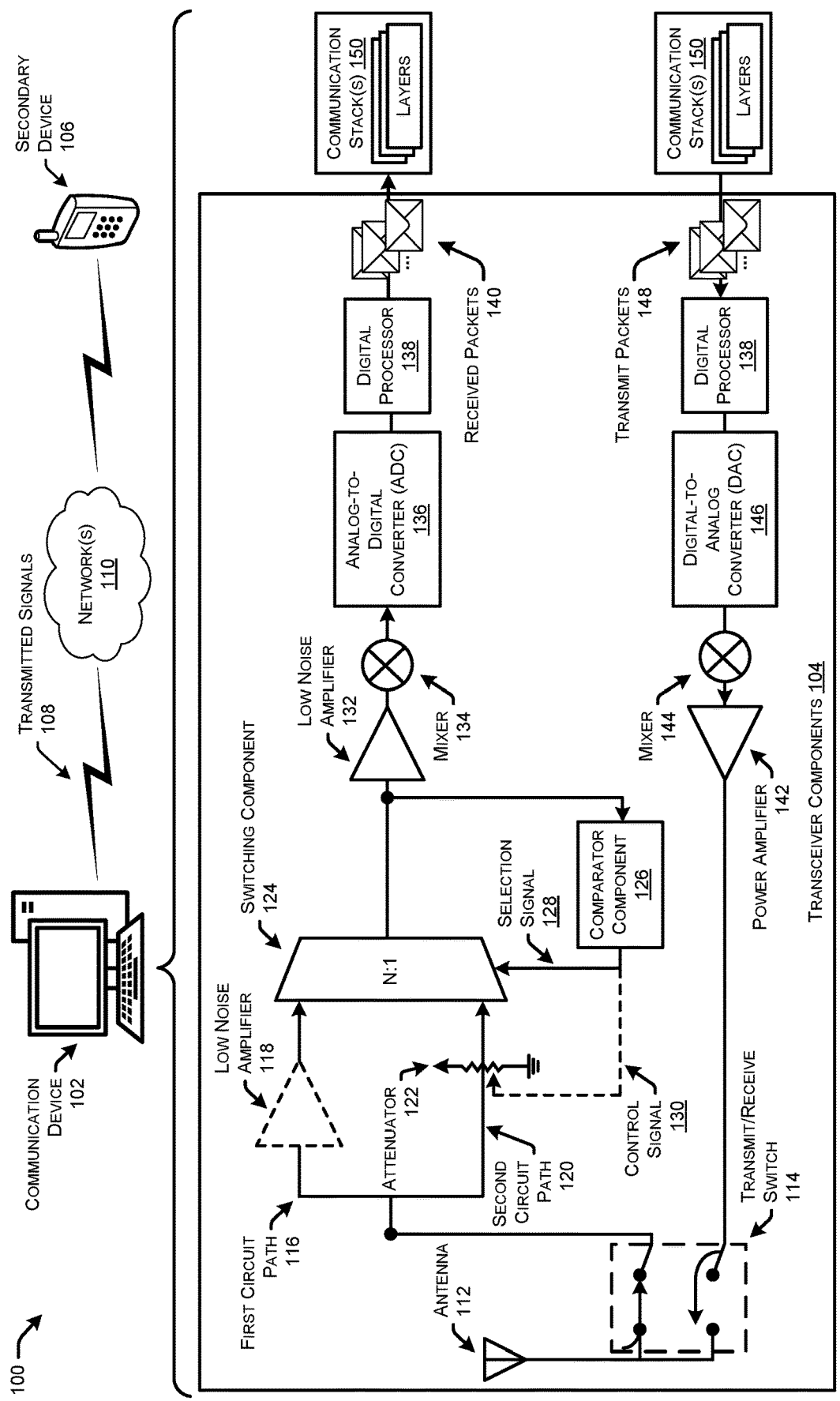
FIG. 1 illustrates a system-architecture diagram of an example environment in which a communication device dynamically controls receiver gain to optimize linearity and sensitivity. The communication device may use a multiplexer to select between multiple circuit paths in the analog front end to optimize analog receiver gain.

This disclosure describes techniques for a communication device with a receiver having an analog front end to dynamically control the gain of the analog front end. Traditionally, an analog front end of a receiver may include a single circuit path between the antenna input and the mixer stage. The single circuit path may include various components and circuitry, such as a band-pass filter (BPF) to reduce image response and a low-noise amplifier (LNA) to amplify weak signals to increase the sensitivity of the receiver, and/or other components. The components of the single circuit path are often selected or configured to optimize the gain based on the strength of signals that are expected or known for the types of communication performed by the communication device. However, as noted above, various conditions may occur in communication devices that may result in saturation, such as unintentional jamming caused by high-power signals in the communication band of the desired signal being received.

Rather than only having a single circuit path in an analog front end, this disclosure describes techniques for implementing multiple circuit paths in the analog front end of a receiver, and selecting a circuit path that optimizes the gain of the analog front end. For example, a first circuit path may amplify (or not affect at all) the power level of the input signal as it passes from the antenna to the mixer stage, and may include various components such as an LNA. This first circuit path may be advantageous for signals that fall below the saturation threshold and/or are not experiencing strong jamming. The analog front end may further include a second circuit path that includes an attenuator component that is configured to reduce the power level of the input signal as it passes from the antenna to the mixer stage to ensure that the signal is attenuated below a power level associated with saturation of the receiver. The second circuit path that includes the attenuator component may be advantageous for signals that are experiencing jamming interference where the signals are higher-power signals that may cause saturation in the receiver.

In some instances, to select from among the circuit paths, the analog receiver front end may include a switching component (e.g., multiplexer, differential amplifier, etc.) configured to select one of the multiple circuit paths for the input signal to pass through. In some examples, the switching component may be at least partly controlled by a comparator component that analyzes the power levels of the signal after being output through each of the circuit paths. For instance, the comparator component may use a selection signal to cause switching component to selectively connect the circuit paths to the output of the switching component. As an example, the comparator component may assert a logic high on the selection signal to indicate that the amplify circuit path is to be connected to an output of the switching component, and assert a logic low on the selection signal to indicate that the attenuate circuit path is to be connected to the output of the switching component.

In some examples, the comparator component may comprise a hardware component, such as an integrated circuit, configured to determine which of the multiple circuit paths is optimized to be used to output the signal. To do so, the comparator component may cause the switching component to sample a portion of the signal in order to analyze the power levels of the signal after being passed through each of the circuit paths. As an example, the signal may represent a packet, and the comparator component may cause the switching component to sample portions of signal representing a preamble of the packet such that each circuit path is connected to the output of the switching component to pass at least a portion of the signal representing the preamble to the comparator component. The comparator component may analyze the power levels of the signal during the preamble of the packet to determine which circuit path is optimized for receiver gain. For example, the comparator component may analyze the power level of the signal output from the amplifying circuit path to determine whether the power level is below a power level associated with saturation of the receiver. Similarly, the comparator component may analyze the power level of the signal output from the attenuator circuit path to determine whether the power level is below the power level associated with saturation of the receiver. Based on which circuit path outputs the signal at the most optimized power level for receiver linearity, the comparator component may use the selection signal to cause the switching component to connect the optimized circuit path to the output of the switching component and the remainder of the receiver circuitry (e.g., mixer stage, analog-to-digital converter, digital processor, etc.).

In some instances, the comparator component may cause the switching component to sample multiple portions of the received signal that represent the preamble of a packet. The comparator component may select the optimized circuit path and cause the switching component to lock the optimized circuit path for the remainder of the signal representing the remainder of the packet after the preamble. In some instances, the analog front end may perform a packet-by-packet analysis such that the most optimized circuit path is selected for each pack. Therefore, the comparator component may, in conjunction with the switching component, analyze the power levels of the signal representing each preamble of the packets represented by the signal, and select the most optimized circuit path to use to output the remaining portions of the packets to the rest of the receiver circuitry.

In some examples, the techniques of this disclosure may be performed using various components. For instance, the switching component may be a multiplexer that has an input for each circuit path and connects one of the circuit paths to an output of the multiplexer that feeds the signal to the comparator component and the remainder of the receiver circuitry. In some instances, the comparator component may be a hardware device located off an integrated circuit of the receiver that includes the digital processor. However, in some instances the components may vary and still accomplish the techniques of this disclosure. For instance, the switching component may comprise a differential amplifier, and the comparator may comprise an on-chip digital comparator component included in a digital front end (DFE) of the receiver chain. Additionally, in some instances the attenuator component may be a static impedance value that is configured to reduce high-power signals to be in the linear region of the receiver. In other examples, the attenuator component may comprise a variable attenuator component that has an impedance which is capable of being modified to change the amount of reduction in power that high-power signals experience when passing through the attenuator circuit path. Accordingly, a variable attenuator component may further allow for finer dynamic tuning of the receiver gain from the analog front end.

The techniques of this application improve the ability for analog receivers to optimize the gain of the analog front end. For instance, traditional receivers with a single circuit path may become saturation when jammers interfere with signals received at an antenna of the receiver. However, according to the techniques described herein, the addition of an attenuator circuit path that may be dynamically selected for a high-power signal allows for dynamic optimization of receiver gain for an analog front end. Accordingly, the techniques of this application allow for receivers to receive higher-power signals without becoming saturated, and dynamically optimize the receiver gain using multiple circuit paths on at least a packet-by-packet basis.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a communication device 102 dynamically controls receiver gain to optimize linearity and sensitivity. The communication device 102 may use a switching component, such as a multiplexer device, to select between multiple circuit paths in the analog front end to optimize analog receiver gain.

Generally, the communication device 102 may include transceiver components 104 (or simply receiver components) and be capable of communicating with a secondary device 106 by sending and/or receiving transmitted signals 108 over one or more networks 110. The communication device 102 may comprise any type of hardware device capable of transmitting and receiving an analog signal over any type of network 110. For instance, the communication device 102 may comprise network devices (e.g., routers, switches, access points, extenders, servers, etc.), personal computing devices (e.g., desktop computers, laptop computers, smartphones, tablets, wearable devices, etc.), smart devices, and/or any other type of devices. The communication device 102 may be configured to communicate over any type of network(s) 110 using any type of communication protocol. The network(s) 110 may include wired and/or wireless networks comprising one of, or any combination of, a Personal Area Networks (PAN), a Local Area Network (LAN), a Wireless Local Area Network (WLAN), a Campus Area Network (CAN), a Metropolitan Area Network (MAN), a Wide Area Network (WAN), a Storage-Area Network (SAN), a System-Area Network (SAN), and/or any other type of network. Further, the communication device 102 may transmit signals 108 over the network(s) 110 using any type of communication protocol or standard, such as any type of wireless communication protocols utilized in the I-T space (e.g., IEEE 802.11 standards, Bluetooth, ZigBee, Z-Wave, 6LoWPAN, etc.).

In an illustrative example, the communication device 102 may comprise a smart device that is capable of communicating using various protocols at least partially at a same time using multiple radios. For instance, the communication device 102 may be a smart device that is streaming audio data using WiFi via a first radio from a wireless access device, such as the secondary device 106, and may also be periodically communicate with another device using another communication protocol that is in the same band as WiFi (e.g., 2.4 GHz), such as ZigBee or Bluetooth via a second radio.

As illustrated, the communication device 102 may include various transceiver components 104 that may be part of a radio. There are of course many different types of transceivers and radios, and the illustrated transceiver components 104 may be modified such as components being changed, added, subtracted, and so forth depending on the type of radio.

The transceiver components 104 may include, or at least be connected to, an antenna 112 configured to transmit various transmitted signals 108 and receive various transmitted signals 108. The antenna 112 may convert voltage from the transceiver components 104 into the transmitted signals 108 to be sent over the network(s) 110, and similarly receive various transmitted signals from secondary devices 106 and convert them into a voltage signal for recovery in the receiver chain. The transceiver components 102 may include a transmit/receive (T/R) switch 114 that is operable to switch between causing the antenna to 112 transmit signals passed from a transmit chain, or receive various transmitted signals 108 that are passed to a receive chain of the transceiver components 104.

When the T/R switch 114 has connected the receive chain of the transceiver components 104, the signal representing communication data received from a secondary device 108 may be sent through the receiver circuitry of the transceiver components 104. This, the antenna 112 may provide an input signal representative of the transmitted signal(s) 108 received from the secondary device 106, and the T/R switch 114 may be configured to pass the input signal from the antenna 112 to the receive chain of the transceiver components 104.

According to the techniques of this disclosure, the transceiver components 104 may include a first circuit path 112, which optionally includes a low noise amplifier 118, as well as a second circuit path 120 that includes an attenuator 122.

As shown, the low noise amplifier 118 is optional, and may not be in the first circuit path 116. Although not shown, the receiver chain may comprise further components, such as a band-pass filter to reduce image response in the input signal before it is passed to one of the circuit paths 116 and 120. The first circuit path 116 may, in some examples simply pass the input signal to a switching component 124. In other examples, the first circuit path 116 may include components, such as a low noise amplifier 118 configured to amplify a low-power input signal without significantly degrading the signal-to-noise (SNR) ratio of the input signal. The LNA 118 may comprise any type of low noise amplifier 118 configured to increase the power of the input signal (and noise present in the signal), and designed to minimize the additional noise in the input signal. Thus, the first circuit path 116 may be advantageous to achieve linearity in the receiver for input signals with lower-power levels. The low noise amplifier 118 may support a power gain in a range of around 1-20 decibels (dB), and may decrease the SNR ratio by less than a factor of two, or in the range of 1-5 dB noise figure.

The second circuit path 120 may include the attenuator 122, which may comprise any type of component configured to reduce the strength or power level of the input signal. In some instances, the attenuator 122 may comprise one or more electrical components designed to reduce the amplitude of the input signal passing through the second circuit path 120 without significantly degrading the integrity of the input signal. The attenuator 122 may comprise one or more resistors, and/or other electrical components, configured in a resistive network for reducing the power level of the input signal. In some examples, the attenuator 122 may comprise a fixed attenuator that is set at a fixed and unchanging attenuation that is placed in the second circuit path 120 to decrease the power level of the input signal. The attenuation at which the fixed attenuator 122 is set may be set based on expected power levels of the high-power signals to be received at the communication device 102. For instance, the communication device 102 may be expected, or other similar devices have been subjected to, particular strong jammers that result in higher-power signals at known power ranges. For instance, the communication device 102 may be configured to transmit signals using another radio at a known output power, and based on this testing or known power levels of strong jammers, the fixed attenuator 122 may be set with a fixed attenuation value to ensure that the resulting power level of the input signal after passing below the attenuator 122 is less than the threshold power level for saturation of the receiver. For instance, the attenuator 122 may be set to ensure that an input signal will be reduced to below the threshold for saturation at a "worst case" high-power signal from a strong jammer.

Depending on the type of transceiver, the linearity range may be between −5 dBm to −60 dBm. Thus, power levels above −60 dBm may result in saturation (depending on the radio, the saturation threshold may be greater, or less). The attenuator 122 may be configured to reduce the power levels of signals by various values, depending on the attenuator. For instance, the amplitude attenuator 122 may reduce the power levels of a received analog signal in a range of 10 dBm to 50 dBm. However, the attenuator may generally comprise any attenuation value to reduce the power level of analog signals received by various amounts.

In some instances, the attenuator 122 may be a programmable, or variable, attenuator 122 that is controlled by a control signal 130, such as an external voltage. As described in more detail in FIG. 2, the programmable attenuator 122 may be driven by a computer or processor, such as being controlled by transistor-transistor logic (TTL) inputs. The programmable attenuator 122 may be selectively configurable such that the attenuation value, or resistivity value, may be changed based on a signal strength of the input signal to ensure that saturation is avoided, but to avoid unnecessary addition of noise in the input signal.

As illustrated, the first circuit path 116 and the second circuit path 120 may each be inputs into a switching component 124 that has a single output, such as a N:1 multiplexer. Although "N" is illustrated as 2 inputs, the switching component 124 may comprise any number of inputs and paths of two or greater. The switching component 124 may comprise any type of hardware-based component (e.g., logic circuit, integrated circuit, etc.) designed to switch one of several input lines through to a single common output line by the application of a control signal selection 128. The switching component 128 may comprise digital circuit made from transistors, MOSFETs, relays, etc., to switch between input signals (e.g., input voltage signals, input current signals, input power signals, etc.) to a single output. However, the switching device 128 may comprise any type of electrical, mechanical, and/or electro-mechanical device usable to selectively switch between one of multiple inputs to a common output.

The switching component 124 may be controlled by a comparator component 126 that receives, as an input, the signal that is output from the switching component 124. The comparator component 126 may comprise any type of electronic component configured to compare two input signals (e.g., two voltage signals, two current signals, two power signals, etc.) and outputting a digital signal indicating which is larger. The comparator component 126 may comprise, for example, an op-amp voltage comparator, a differential amplifier, and/or any type of hardware device or integrated circuit configurable to compare signals. In some examples, the comparator component 126 may receive, as one input, the signal that is output from the switching component 124 (e.g., the input signal after passing through one of the first circuit path 116 or the second circuit path 120). The comparator component 126 may compare the signal output from the switching component 124 with a threshold reference signal (e.g., threshold power level, threshold voltage level, etc.).

As an example, the comparator component 126 may receive a signal from the switching component 124 that has passed through the first circuit path 116. The comparator component 126 may compare that signal with the threshold reference signal to determine whether the signal from the first circuit path 116 is above the threshold that can cause saturation (e.g., too high of a power level for the first circuit path 116 to handle). In such examples, the comparator component 126 may select the second circuit path 120 for the remainder of the signal to pass through to reduce the power level of the signal to avoid saturation of the receiver. Alternatively, if the comparator component 126 determines that the power level of the signal that is passing through the first circuit path 116 is below the threshold signal value associated with saturation, then the comparator component 126 may determine that the first circuit path 116 for the remainder of the signal to pass through. In order to cause the switching component 124 to chance which circuit path is connected from the input to the output of the switching component 124, the comparator component may utilize the selection signal 128 to select a path. For example, the comparator component 126 may use the selection signal 128 to indicate logic high (or "1") to have the switching component 124 select the first circuit path 116, and use the selection signal 128 to indicate logic low (or "0") to indicate that the second circuit path 120 is to be used (or vice-versa). Alternatively, any other method of indicating which path is to be connected to the output of the switching component 124 may be performed using the selection signal(s) 128.

In some instances, the comparator component 126 may dynamically monitor the signal level on both paths 116 and 120 during the preamble portion of the packet represented in the received signal for, as an example, a 50% duty cycle. For instance, during the preamble portion of the received signal, the comparator component 126 may dynamically select the input to the switching component 124 to be connected to the output with a digital selection signal 128. The monitored signal levels received from the output of the switching component 124 are then sampled, averaged, and compared to the threshold level associated with saturation to make the decision on the best path (or optimized path) to choose during actual data reception. Sampled portions of the signal received from the first circuit path 116 and the second circuit path 120 may be averaged and compared to the threshold level associated with saturation to determine which of paths 116 or 120 will not result in saturation and results in the receiver operating in the linear region. As noted above, the comparator component 126 may select the first circuit path 116 when the sampled portions of the signal from the first circuit path 116 are below the threshold reference signal associated with saturation (e.g., no strong jammer present). However, the comparator component 126 may select the second circuit path 116 when the sampled portions of the signal from the first circuit path 116 is above the threshold signal level associated with saturation of the receiver. In this way, the sensitivity on the received signal is maximized by increasing the gain on the desired signal, hence reducing the noise figure, and also maximizing the SNR.

After the comparator component 126 has decided which of the first circuit path 116 or the second circuit path 120 is optimized for the signal representing the packet, the comparator component 126 may use the selection signal 128 to cause the switching component 124 to connect the optimized path to the output of the switching component 124 for at least the remainder of the packet (e.g., payload, post amble, etc.). When the preamble of a new packet is detected, the comparator component 126 may reperform the process by causing the switching component 124 to sample portions of the preamble of the next packet to determine an optimized path for the next packet.

When the communication device 102 is not receiving/processing a packet, the comparator component 126 may cause the switching component to switch between the inputs according to the duty cycle until a preamble is detected. Receiver circuitry may provide the comparator component 126 an indication of when the preamble has completed processing, and the comparator component 126 may cause the switching component 124 to lock into the most optimized path to ensure the remainder of the packet (e.g., data after the preamble including the payload) is processed through the optimized circuit path.

In this way, the optimized circuit path is selected for the received signals to pass through to the remaining portion of the receiver circuitry. As shown, the signal may be output from the switching component 124 to other components, such as another LNA 132 (optionally included) and then the mixer stage 134. The mixer 134 may generally be configured to shift signals from one frequency range into another (known as "heterodyning"), to result in the signal being easier to process in later processing. Further, the signal may pass to an analog-to-digital converter (ADC) 136 that converts the analog signal into a digital signal. The ADC 136 may generally comprise any type of ADC 136 usable to convert the signal from an analog signal into a digital signal for further processing by a digital processor 138. The digital processor 138 (or digital signal processor (DSP)) may comprise any type of digital processor 138, including baseband processors of a network interface, configured to perform known techniques, such as demodulating the signal and/or performing other operations to process one or more received packets 140. However, any known architecture for receiver chains may be used, substituted, or otherwise implemented in the transceiver components 104 without departing from the techniques of this disclosure.

Further, in examples where the communication device 102 includes transceiver components with a transmit chain (e.g., rather than only a receiver chain, which is contemplated in this disclosure). The transmit chain may receive one or more transmit packets 148 to be transmitted by the transceiver, which are processed by the digital processor 138, passed through a digital-to-analog converter (DAC) 146 that converts the digital representation of the transmit packets 148 into an analog signal representing the transmit packet(s) 148. The analog signal then is passed through a mixer 144 to shift the frequency into a range for transmission (e.g., carrier frequency). The analog signal is then passed into a power amplifier 142 that boosts a power of the signal for transmission, and passed through the T/R switch 114 for transmission by the antenna 112.

The communication device 102 may further include one or more communication stacks 150 having multiple layers. The communication stack(s) 150 may generally comprise software layers that perform various functionality for enabling the communication device 102 to communicate using protocols known in the art. For instance, the communication stack(s) 150 may comprise two or more of Bluetooth, ZigBee, WiFi, and/or any other type of communication protocol. Generally, the communication stack(s) 150 may configure to communication (e.g., transmit and receive) packets using multiple protocols that are communicated in at least partially overlapping frequency bands.

In an illustrative example, the communication device 102 may include one or more of multiple radios, multiple receivers, multiple transmitters, a receiver and a transmitter, etc., such that multiple signals may be communicated by the communication device 102 at least partly at a same time. For instance, a first radio in the communication device 102 may be transmitting a signal 108 using a first protocol, and a second radio in the communication device 102 may be receiving another transmitted signal 108. In a specific example, the communication device 102 may be transmitting one or more transmitted signals 108 using a first radio according to a WiFi protocol in the 2.4 GHz band, and at least partly at the same time, the communication device 102 may be using the transceiver components 104 of a second radio to receive one or more transmitted signals 108 sent via the ZigBee protocol in the 2.4 GHz band. In such an example, the transmitted WiFi signal 108 may be a strong jammer for reception of the transmitted ZigBee signal 108 such that the received ZigBee signal 108 is at a higher-power level. In such examples, the comparator 126 may sample the preamble of the higher-power ZigBee signal, determine that the first circuit path 116 would result in saturation of the receiving path. Thus, the comparator component 126 may cause the received ZigBee signal 108 to pass through the second circuit path 120 to be attenuated by the attenuator 122 to result in maximum linearity in the receiver.

Figure 2:
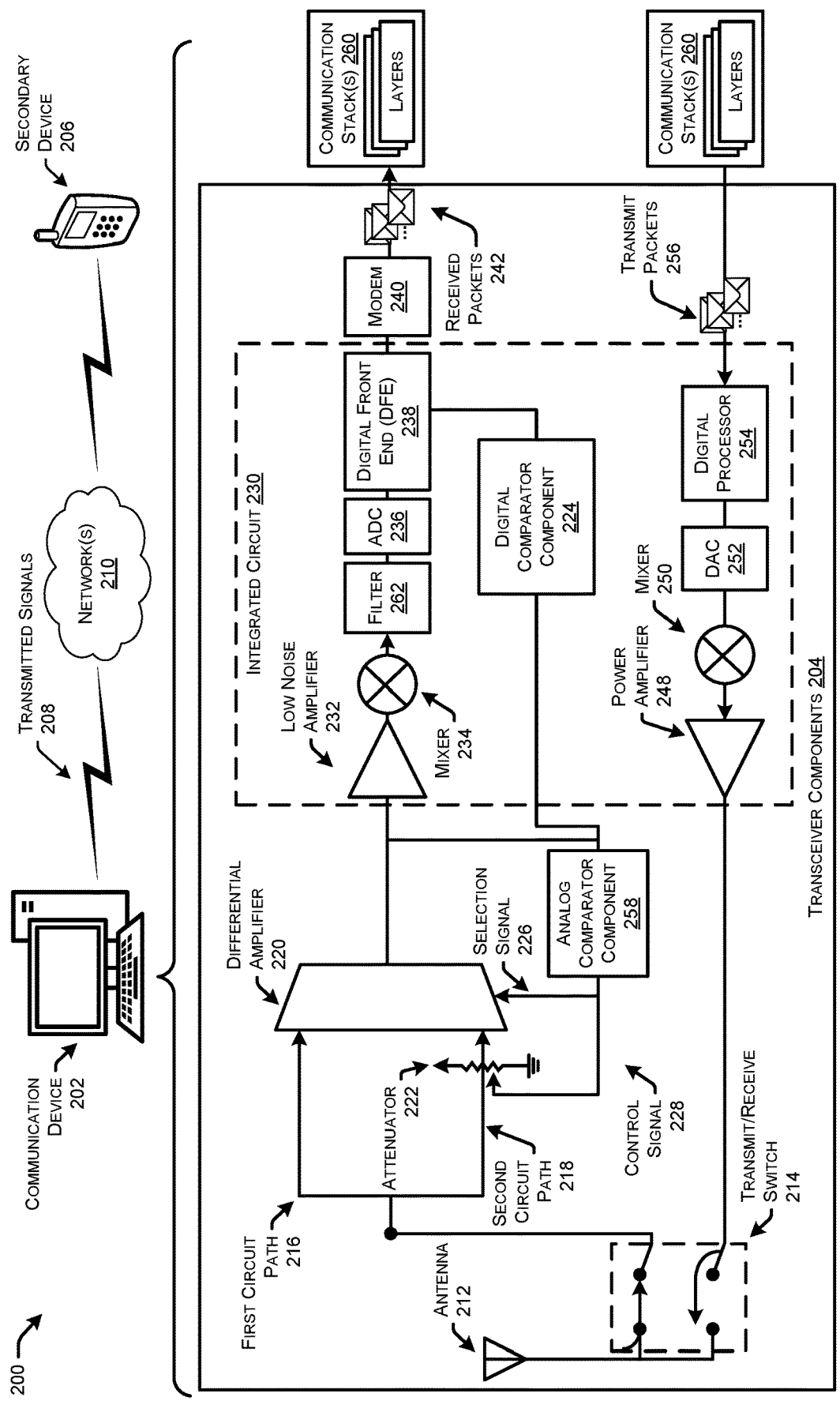
FIG. 2 illustrates another system-architecture diagram of an example environment in which a communication device dynamically controls receiver gain to optimize linearity and sensitivity. The communication device may use a differential amplifier to select between multiple circuit paths in the analog front end to optimize analog receiver gain.

FIG. 2 illustrates another system-architecture diagram of an example environment 200 in which a communication device 202 dynamically controls receiver gain to optimize linearity and sensitivity. The communication device 202 may use a differential amplifier to select between multiple circuit paths in the analog front end to optimize analog receiver gain. Insofar as components are labeled similarly, as positioned similarly, as the components of FIG. 1, the components may have the same use or meaning as the description of the components in FIG. 1.

As illustrated in FIG. 2, the transceiver components 204 may differ from the transceiver components 204 in some examples. For example, the first circuit path 216 may not include an LNA in this example, and instead of the LNA, the switching component 124 may be substituted for a differential amplifier 220. A differential amplifier 220 may comprise any type of electronic amplifier that has two different inputs that can be dynamically selected at least partly using a selection signal 226. In some instances, the transceiver components 204 may include an integrated circuit (IC) 230 on which the LNA 232, mixer 234, ADC 236, and a digital front end (DFE) 238 are located. In some instances, the transceiver components 204 may include an off-chip comparator (e.g., not located on the IC 230), and in other examples, the IC 230 may include an on-chip digital comparator component 224. For instance, rather than analyzing the analog signal prior to the ADC 236 to determine saturation, the DFE 238 may include the digital comparator component 224 that analyzes the digital signal to determine whether the receiver chain is saturated by a high-power signal caused by, for example, a strong jamming interferer. The digital comparator component 224 may use the selection signal 226 to control the differential amplifier 220 to dynamically select one of the first circuit path 216 or the second circuit path 218 to identify the maximum linearity path. As described above, in some examples, the DFE 238 (potentially the digital comparator component 224), may further control a programmable attenuator 222. The programmable attenuator 222 may be dynamically changed such that the reduction of the power of the signal is enough to prevent saturation, but not too low as to cause excess noise in the signal.

In some examples, the digital comparator component 224 may work in conjunction with an analog comparator component 258 to determine which path is optimized for receiving the data packet. For instance, the digital comparator component 224 may analyze the packet after the analog signal has been converted from analog to digital via the ADC 236. Further, the digital signal representing the data packet may have passed through a filter 262 (e.g., low pass filter, bandpass filter, etc.) which removes interference and/or noise from the digital signal. The digital comparator component 224 may then determine that a particular path will result in linearity despite the analog comparator component 258. For instance, the analog comparator component 258 may have determined that the first circuit path 216 is above the saturation level, but after being filtered, the digital comparator component 224 may determine that the first circuit path 216 achieves linearity and is the most optimized circuit path. Accordingly, the digital comparator component 224 may instruct the analog comparator component 258 to use the selection signal 226 to instruct the differential amplifier 220 to select the first circuit path 216 for the remainder of the packet.

In some instances, to control the differential amplifier 220, the analog comparator component 258 (and/or the digital comparator component 224) may use general purpose input/output (GPIO) pins available via the integrated circuit 230. During the selection process while the preamble is being received, the GPIO may be driver to two different states for the different circuit paths (e.g., "1" or "0"). The GPIO would be driven to those states for a prescribed amount of time to average out the time domain power being observed on each path (e.g., one microsecond on each path). In this way, the DFE 238 may provide the two power levels to the digital comparator component 224 to make a decision on which path to use for receiving the remainder of the data packet.

Figure 3:
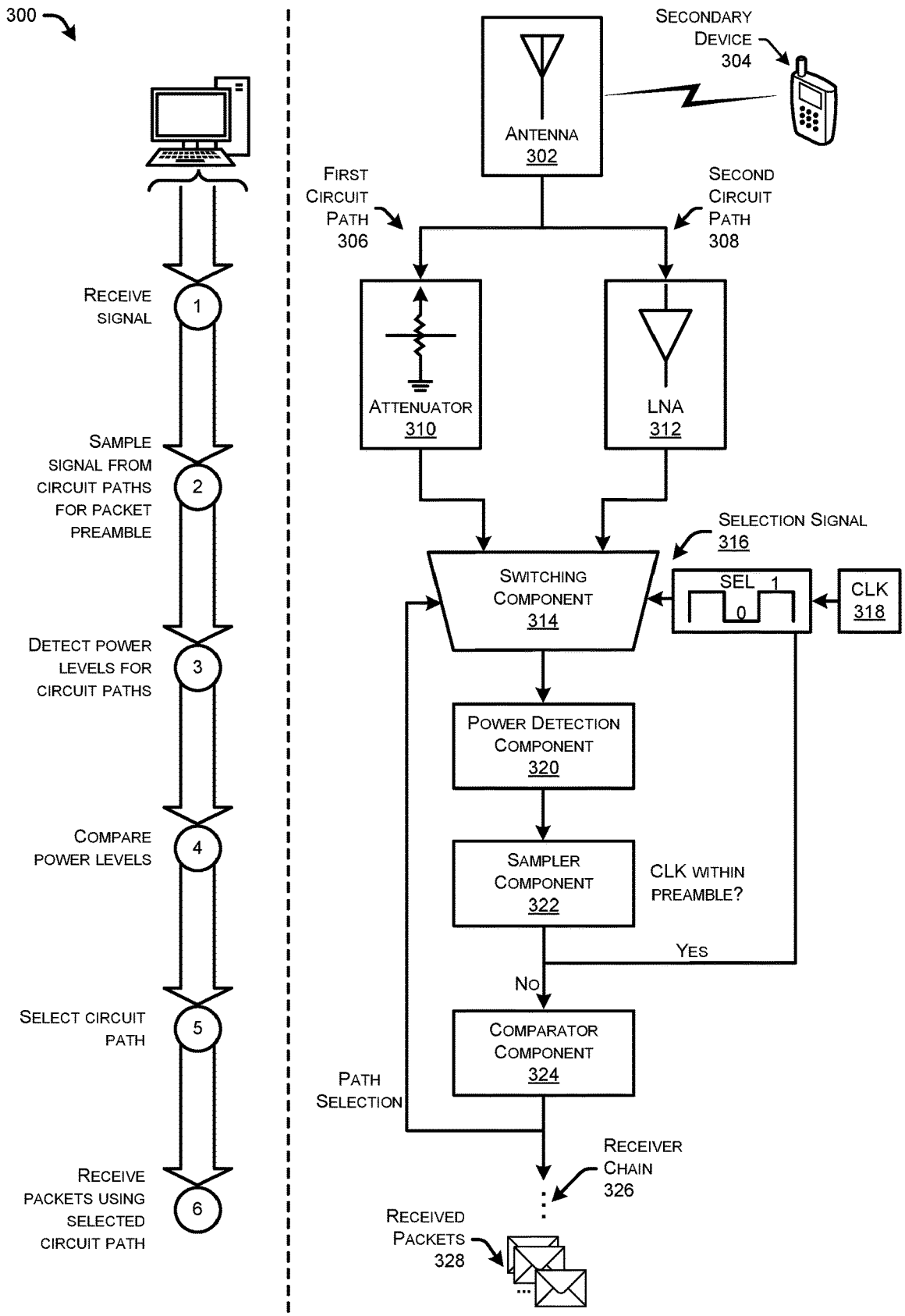
FIG. 3 illustrates a flow diagram of an example signal flow through an analog front end. The analog front end may include multiple circuit paths that may be selected from to optimize the gain of the analog front end.

FIG. 3 illustrates a flow diagram 300 of an example signal flow through an analog front end. The analog front end may include multiple circuit paths that may be selected from to optimize the gain of the analog front end.

At "1," the antenna 302 of a communication device 102 may receive a signal transmitted from a secondary device 304. The antenna 302 may generally receive the transmitted signal from the secondary 304 and convert the voltage and/or power signal of the transmitted signal into an input analog signal for recovery in a receiver chain of the communication device 102.

At "2," the sampler component 322 may sample portions of the analog signal from the first circuit path 306 and the second circuit path 308 for a preamble of a packet. In some instances, the sampler component 322 may be included in, or comprise, the comparator component 324. The sampler component 322 may configured to determine whether a clock of the communication device 102 is within the preamble of the packet. Generally, a modem of the communication device 102 may have state machines where it is in multiple modes. In one mode, the modem is waiting for a packet and in another mode, the modem is demodulating the packet it received. Generally, the sampler component 322 may use a clock 218 to drive a selection signal 316 to cause the switching component 314 to switch until a preamble state hits. At the end of the preamble state, the sampler component 322 stops the switching component 314 from sampling. Thus, if the sampler component 322 determines that "yes," the clock is within the preamble, then the sampler component 322 will continue to sample the signal from each of the paths 306 and 308. For instance, the sampler component 322 may instruct a switching component 314 to alternate between connecting the first circuit path 306 and the second circuit path 308 at, for example, a 50% duty cycle of the clock 318. In that way, the signal alternates between flowing through the attenuator 310 of the first circuit path 306 and the LNA 312 of the second circuit path 308.

At "3," the power detection component 320 may detect power levels of the signal being output from each of the circuit paths 306 and 308. In some instances, the power detection component 320 may be included in the comparator component 324 or at least communicate with the comparator component 324. For instance, while the preamble of the signal is being sampled, the power detection component 320 may detect power levels of each sample of the signal received from the first circuit path 306 and the second circuit path 308. Further, the power detection component 320 may compute average power levels for the sampled signal portions for each path such that the signal portions passing through the first circuit path 306 has a computed average power level and the signal portions passing through the second circuit path 308 has another computed average power level.

At "4," the comparator component 324 may compare the average power levels of the signal passing through each of circuit paths 306 and 308. For instance, the power detection component 320 may provide indications of the average power levels of the signal passing through each path of the comparator component 324. The comparator component 324 may perform various operations for compare the power level averages. As an example, the comparator component 324 may compare each of the power levels to a threshold power level associated with saturation. For instance, the comparator component 324 may determine whether the power levels for the signals received through each of the circuit paths 306 and 308 are above or below a threshold power level associated with saturation of the receiver. In some instances, the comparator component 324 may additionally, or alternatively determine whether the power levels are below a threshold associated with a minimum signal strength required by the receiver chain. The comparator component 324 may comprise only an analog comparator component 126 (or 258), only a digital comparator component 224, and/or a combination of an analog comparator component 258 and a digital comparator component 224.

At "5," the comparator component 324 may select one of the first circuit path 306 or the second circuit path 308 for the remaining portion of the signal to pass through to the receiver circuitry. For instance, the comparator component 324 may select the second circuit path 308 in examples where the power level of the signal from the second circuit path 308 is above the threshold associated with saturation. Alternatively, the comparator component 324 may select the first circuit path 306 based on determining that the power level of the signal from the second circuit path 308 is above the threshold power level associated with saturation. In such examples, the attenuator 310 may be needed to reduce the power level of the signal to avoid saturation due to, for example, a jamming interferer.

At "6," the receiver circuitry of the communication device 102 may receive communication packets represented in the transmitted signal 108 using the selected path. For instance, the comparator component 324 may perform path selection by causing the switching component 314 to lock the selected circuit path determined in step "5." The switching component 314 may connect the selected circuit path such that the signal is passed through the optimized signal path for linearity.

Figure 4:
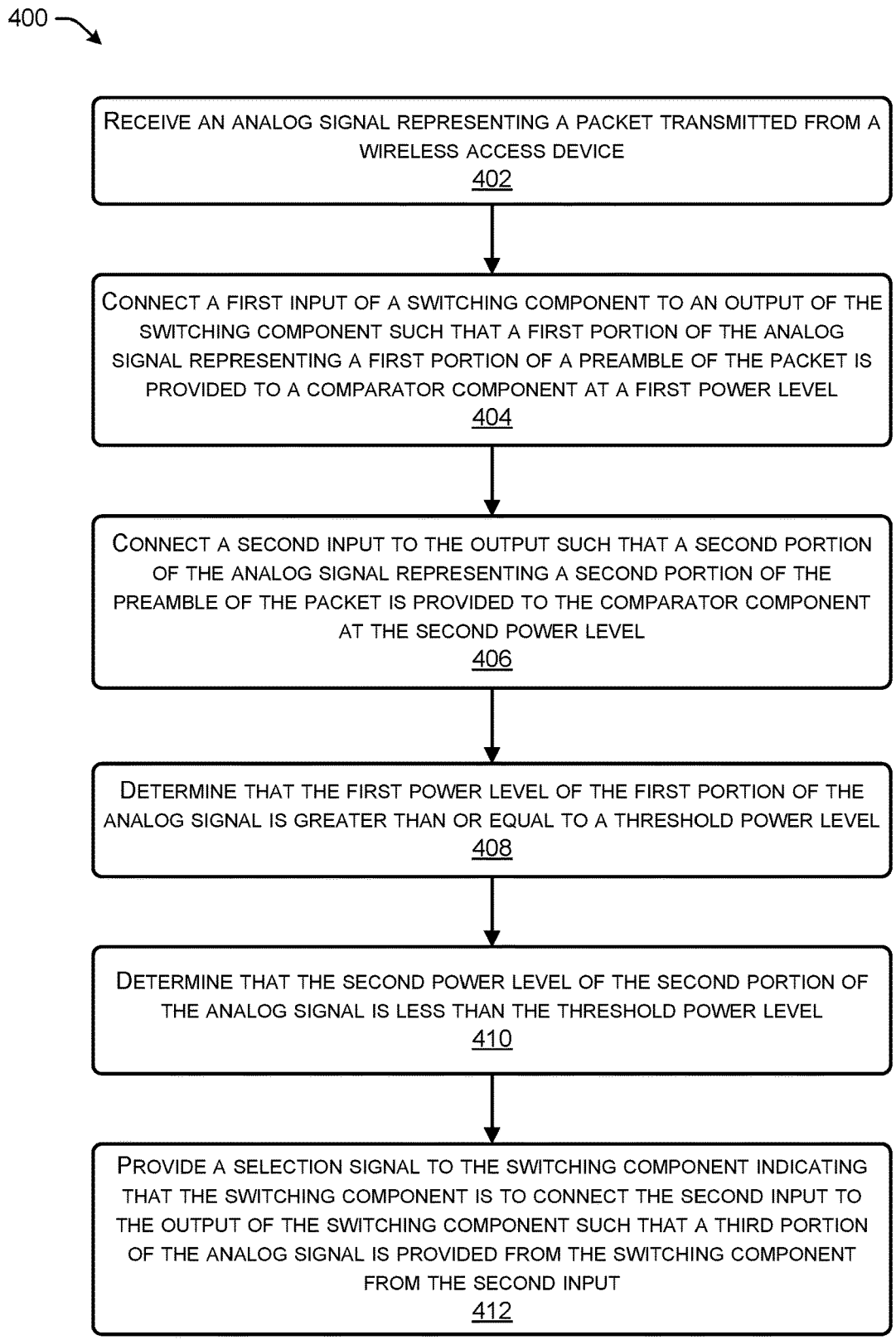
FIG. 4 illustrates a flow diagram of an example method in which a communication device selects a circuit path, from among multiple circuit paths, in an analog front end for received signals to pass through to optimize receiver gain. The communication device may select the circuit path based on power levels associated with the multiple circuit paths.

FIGS. 4 and 5 illustrate flow diagrams of example methods 400 and 500 that illustrate aspects of the functions performed at least partly by the communication device 102 as described in this disclosure. The logical operations described herein with respect to FIGS. 1-3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 in which a communication device 102 selects a circuit path, from among multiple circuit paths, in an analog front end for received signals to pass through to optimize receiver gain. The communication device 102 may select the circuit path based on power levels associated with the multiple circuit paths.

The techniques of the method claim 400 may be performed by a smart device (e.g., communication device 102) that may include an antenna configured to receive a signal representing a packet transmitted from a wireless access device (e.g., secondary device 106). In a specific example, the smart device may be streaming audio data, such as music, through a wireless access device (e.g., a router) over a WiFi connection. The smart device may additionally be communicating with another device using a communication protocol that at least partially overlaps with the frequency band of WiFi.

At 402, the smart device may receive an analog signal representing a packet transmitted from the wireless access device. For instance, the smart device may include an antenna 112 that receives an analog signal that is part of a data stream, such as an audio stream of data from the wireless access point.

At 404, the switching component may connect a first input of a switching component 124 to an output of the switching component 124 such that a first portion of the analog signal representing a first portion of a preamble of the packet is provided to a comparator component 126 at a first power level. In some instances, the comparator component may instead be a digital comparator component 224, and/or a combination of the analog comparator component 258 and the digital comparator component 224.

At 406, the switching component may connect a second input to the output such that a second portion of the analog signal representing a second portion of the preamble of the packet is provided to the comparator component 126 at the second power level. Generally, the first input may be connected to at least one of a low noise amplifier 118 or an attenuator 122, and the second input may comprise a different one of the at least low noise amplifier 118 or the attenuator 122. The steps 404 and 406 may, in some examples, be repeated according to a duty cycle for a preamble of the packet.

At 408, the comparator component may determine that the first power level of the first portion of the analog signal is greater than or equal to a threshold power level associated with saturation of the smart device. For instance, the comparator component 126 may determine that first power level received from (for example) a low noise amplifier 118 is above a saturation level such that the smart device would be saturated if the analog signal passed through the first circuit path 116.

At 410, the comparator component may determine that the second power level of the second portion of the analog signal is less than the threshold power level. For instance, the comparator component 126 may determine that the second power level of the analog signal received from the second path 120 that includes the attenuator 122 is less than the threshold power level associated with saturation of the smart device.

At 412, the comparator component may provide a selection signal to the switching component indicating that the switching component is to connect the second input to the output of the switching component such that a third portion of the analog signal is output from the switching component from the second input. For instance, the comparator component 126 may assert a selection signal 128 (e.g., 0 or 1) to the switching component 124 that indicates the switching component 124 is to connect the second circuit path 120 including the attenuator 122 to the output of the switching component 124 to provide the analog signal to the receiver circuitry at the second power level.

In some examples, the amplitude attenuator 122 comprises a variable amplitude attenuator 122. The comparator component 126 may be further configured to analyze the second power level of the analog signal, and based at least in part on the analyzing the second power level, cause the variable amplitude attenuator to change from a first impedance to a second impedance. For instance, the comparator component 126 may determine how close the second power level is to the threshold power level associated with saturation of the smart device. The comparator component 126 may determine the second impedance value based on this analysis. For instance, the comparator component 126 may select the second impedance such that the second power level is below the saturation threshold, but near the saturation threshold to minimize the amount of noise brought in by the variable amplitude attenuator. Further, the switching component 124 may further configured to, based at least in part on the selection signal 128, connect the second input to the output of the switching component 124 such that the third portion of the analog signal passes through the variable amplitude attenuator at the second impedance. In some instances, the comparator component 126 may determine the impedance value for the variable amplitude attenuator 122 based on how far under the second power level is from the threshold power level. It may be advantageous to set the variable amplitude attenuator 122 a low value to reduce the amount of noise introduced, but to ensure that the power level remains below the threshold power level. For example, if the second power level is less than the threshold power level by more than some threshold amount (e.g., more than 10% lower, more than 30% lower, etc.), the comparator component 126 may decrease the impedance value such that the second power level increases, by remains below the threshold power level.

FIG. 5 illustrates a flow diagram of an example method 500 in which a communication device 102 selects a circuit path, from among multiple circuit paths, in an analog front end for received signals to pass through to optimize receiver gain.

At 502, the communication device 102 may receive, using an antenna of the communication device, an analog signal representing a packet. For instance, the communication device 102 may use the antenna 112 to convert a transmitted signal into an analog signal representing a data packet.

At 504, the communication device 102 may connect, by a switching component, a first input to an output of the switching component such that a first portion of the analog signal is provided to a comparator component and receiver circuitry at a first power level. For instance, the switching component 124 may connect a first input to the output such that a first portion of the analog signal is provided to the comparator component 126 and receiver circuitry (e.g., LNA 132, mixer 134, ADC 136, digital processor 138, communication stack(s) 150, etc.).

At 506, the communication device may connect, by the switching component, a second input to the output such that a second portion of the analog signal is provided at a second power level to the comparator component and the receiver circuitry. For example, the communication device 102 may connect, by the switching component 124, a second input to the output such that the second portion of the of the analog signal is provided at a second power level to both the comparator component 126 and the receiver circuitry.

At 508, the comparator component may, based at least in part on at least one of the first power level or the second power level, provide a selection signal to the switching component that causes the switching component to connect the second input to the output such that the third portion of the analog signal is provided to the receiver circuitry. For instance, the comparator component 126 may, based at least in part on at least one of the first power level or the second power level, provide a selection signal to the switching component 124 that causes the switching component 124 to connect the second input to the output such that the third portion of the analog signal is provided to the receiver circuitry.

Figure 6:
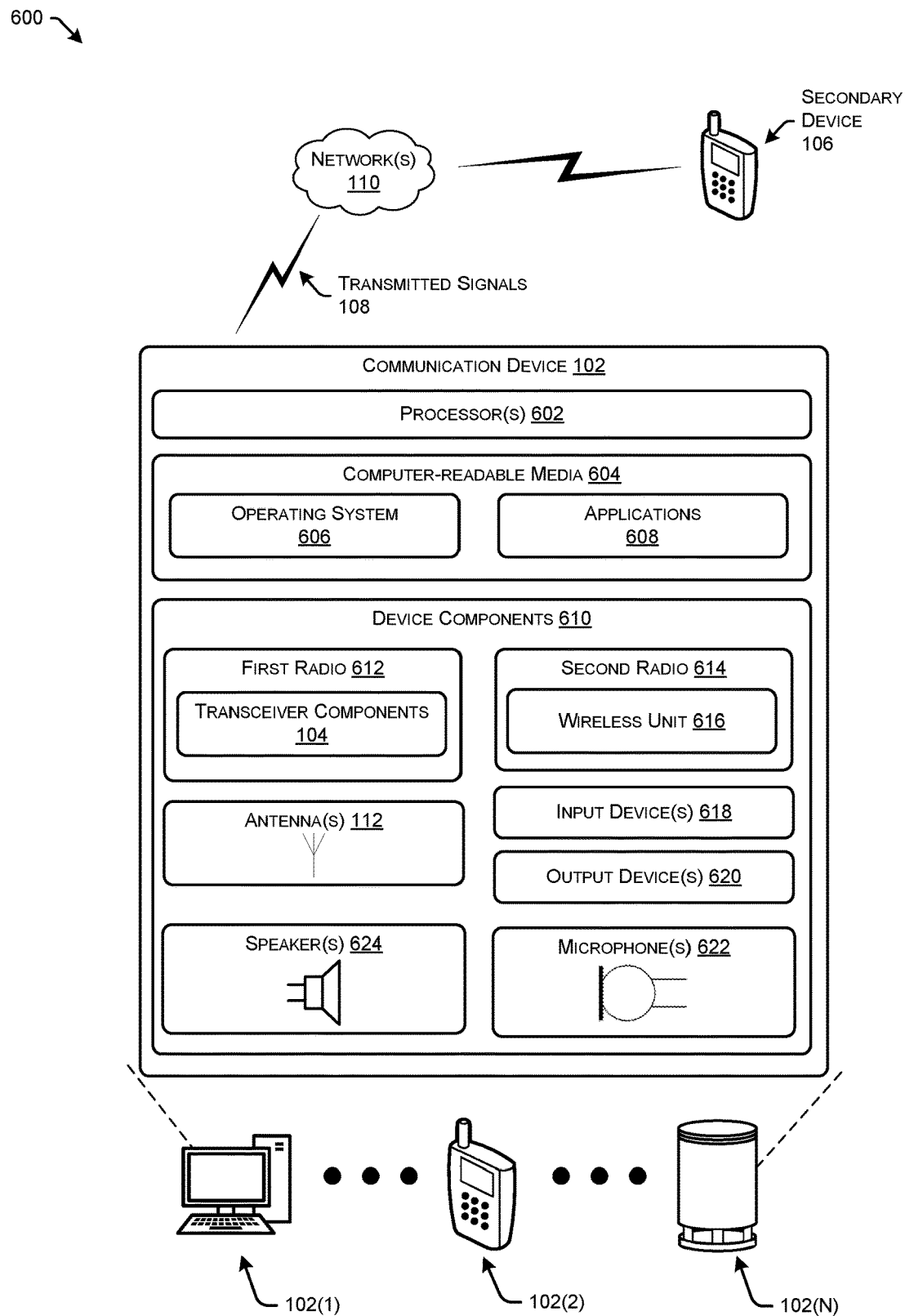
FIG. 6 illustrates a component diagram of example components of an electronic device configured for performing receiver-gain optimization techniques in an analog front end.

FIG. 6 illustrates a component diagram 600 of example components of a communication device 102 configured to dynamically select a circuit path in a receiver that achieves maximum linearity. The communication device 102 may comprise any type of device capable of communicating data using one or more communication protocols.

In the illustrated implementation, the communication device 102 includes one or more processors 602 and computer-readable media 604. In some implementations, the processors(s) 602 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 602 may possess its own local memory, which also may store program modules, program data, and/or one or more operating systems.

The computer-readable media 604 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 604 may be implemented as computer-readable storage media ("CRSM"), which may be any available physical media accessible by the processor(s) 602 to execute instructions stored on the memory 604. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 602.

Several applications 608 and/or other programs may be stored within the computer-readable media 604 and configured to execute on the processor(s) 602. The applications may comprise any type of application configured to execute on the computing device and utilize the transceiver components 104 to transmit and/or receive data. An operating system 606 may be configured to manage hardware and services within and coupled to the device 102 for the benefit of other modules.

The electronic device 106 may further include the device components 610 described herein, such as the transceiver components 104 to transmit and receive communication signals, as well one or more antennas 112. As shown, the device components 610 may include a first radio 612 that includes the transceiver components 104, and may further include a second radio 614 that includes a wireless unit 616. The first radio 612 may be configured to communicate using a first communication protocol, and the second radio 614 may be configured to communicate using a second radio 614 that communicates using a second communication protocol in a frequency band that at least partially overlaps with the first communication protocol. The wireless unit 616 may be coupled to the antenna 616 to facilitate a wireless connection to a network 110. The wireless unit 616 may include the transceiver components 104 and implement one or more of various wireless technologies, such as Wi-Fi, Bluetooth, RF, ZigBee, and so on.

Further, the communication device 102 has input devices 612 and output devices 614. The input devices 612 may include a keyboard, keypad, mouse, touch screen, joystick, control buttons, capacitive sensor, scroll wheel, etc. In some implementations, one or more microphones 618 may function as input devices 612 to receive audio input, such as user voice input. The output devices 614 may include a display, a light element (e.g., LED), or the like. In some implementations, one or more speakers 620 may function as output devices 614 to output audio sounds.

Generally, the communication device 102 may comprise any type of computing device, such as network devices (e.g., routers, access points, switches, servers, etc.) and/or personal computing devices (e.g., phones, tablets, wearable devices, laptops, smart devices, etc.). In some examples, the communication device 102 is a smart device that is connected to other devices using multiple networks 110 using different protocols such as Bluetooth, Zigbee, NFC, WiFi, LiFi, 3G, etc. that can operate to some extent interactively and autonomously.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A communication device comprising:
   an antenna to receive an analog signal representing a packet transmitted from a wireless access device, the analog signal having a received power level;

an amplifier disposed between the antenna and a first input of a switching component of the communication device, the amplifier configured to amplify the received power level to a first power level;
an amplitude attenuator disposed between the antenna and a second input of the switching component, the amplitude attenuator configured to reduce the received power level to a second power level;
the switching component being selectively configured to:
at a first time, connect the first input to an output of the switching component such that a first portion of the analog signal representing a first portion of a preamble of the packet is provided to a comparator component at the first power level; and
at a second time, connect the second input to the output of the switching component such that a second portion of the analog signal representing a second portion of the preamble of the packet is provided to the comparator component at the second power level;
the comparator component configured to:
determine that the first power level of the first portion of the analog signal is greater than or equal to a threshold power level associated with a saturation power level of receiver circuitry in the communication device;
determine that the second power level of the second portion of the analog signal is less than the threshold power level; and
provide a selection signal to the switching component causing the switching component to connect the second input to the output of the switching component such that a third portion of the analog signal is output from the switching component.

2. The communication device of claim 1, wherein:
the third portion represents a payload of the packet; and
the comparator component is further configured to:
receive an indication that the payload of the packet has been received; and
based at least in part on receiving the indication, cause the switching component to periodically switch between connecting the first input to the output and the second input to the output until a subsequent packet is detected.

3. The communication device of claim 1, wherein:
the amplitude attenuator comprises a variable amplitude attenuator;
the comparator component is further configured to:
determine that the second power level is less than the threshold power level by at least a threshold amount;
based at least in part on the second power level being less than the threshold power level by more than the threshold amount, cause the variable amplitude attenuator to set a first impedance value; and
the switching component is further configured to, based at least in part on the selection signal, connect the second input to the output of the switching component such that the third portion of the analog signal passes through the variable amplitude attenuator.

4. A communication device comprising:
an antenna;
a first component located between the antenna and a first input of a switching component of the communication device, the first component receives an analog signal from the antenna and provides the analog signal to the first input at a first power level;
a second component located between the antenna and a second input of the switching component, the second component provides the analog signal to the second input at a second power level that is different than the first power level;
the switching component configured to:
connect the first input to an output of the switching component such that a first portion of the analog signal is provided to a comparator component of the communication device at the first power level; or
connect the second input to the output such that a second portion of the analog signal is provided to the comparator component at the second power level; and
the comparator component configured to:
based at least in part on at least one of the first power level or the second power level, provide a selection signal to the switching component causing the switching component to connect the second input to the output such that a third portion of the analog signal is provided to the comparator component, the third portion of the analog signal being received subsequent to the first portion and the second portion.

5. The communication device of claim 4, wherein the comparator component is configured to determine that the second power level is less than a threshold power level associated with saturation of the communication device.

6. The communication device of claim 4, wherein the comparator component is configured to determine that the first power level is greater than a threshold power level associated with saturation of the communication device.

7. The communication device of claim 4, wherein the comparator component is further configured to:
cause the switching component to connect the first input to the output of the switching component; and
cause the switching component to connect the second input to the output of the switching component.

8. The communication device of claim 4, wherein:
the first component comprises an amplifier; and
the second component comprises an amplitude attenuator.

9. The communication device of claim 4, wherein:
the first portion of the analog signal represents a first portion of a preamble of a data packet;
the second portion of the analog signal represents a second portion of the preamble of the data packet; and
the third portion of the analog signal represents a payload of the data packet.

10. The communication device of claim 4, wherein:
the second component comprises a variable amplitude attenuator; and
the comparator component is further configured to:
based at least in part on the second power level, cause the variable amplitude attenuator to set a first impedance value; and
the switching component is further configured to connect the second input to the output such that the third portion of the analog signal passes through the variable amplitude attenuator.

11. The communication device of claim 4, further comprising:
receiver circuitry coupled to the comparator, the receiver circuitry including an analog-to-digital converter (ADC) that converts the first portion of the analog signal to a first digital signal and converts the second portion of the analog signal to a second digital signal; and wherein the comparator component comprises a digital comparator, the digital comparator configured to determine that the first power level is greater than a threshold power level associated with saturation of the receiver circuitry.

12. The communication device of claim 4, wherein the comparator component comprises an analog component and a digital component, wherein:
the digital component compares the first power level or the second power level with a threshold power level and provides an indication to the analog component; and
the analog component determines that the indication represents an instruction to cause the switching component to connect the second input to the output and, based at least in part on the indication, provides the selection signal to the switching component causing the switching component to connect the second input to the output.

13. A method comprising:
receiving, using an antenna of a communication device, an analog signal;
connecting, at a first time and by a switching component of the communication device, a first component to an output of the switching component such that a first portion of the analog signal passes through the first component to a comparator component of the communication device at a first power level;
connecting, at a second time and by the switching component, a second component to the output such that a second portion of the analog signal is provided to the comparator component at a second power level that is different than the first power level;
analyzing, at the comparator component, at least one of the first power level or the second power level with reference to a threshold power level; and
based at least in part on the analyzing, providing, by the comparator component, a selection signal to the switching component causing the switching component to connect the second component to the output such that a third portion of the analog signal is output to the comparator component at a third time subsequent the first time and second time.

14. The method of claim 13, further comprising determining, by the comparator component, that the second power level is less than the threshold power level associated with saturation of the communication device.

15. The method of claim 13, further comprising determining, by the comparator component, that the first power level is greater than the threshold power level associated with saturation of the communication device.

16. The method of claim 13, further comprising:
providing, by the comparator component, a first control signal to the switching component causing the switching component to connect, at the first time, the first component to the output; and
providing, by the comparator component, a second control signal to the switching component causing the switching component to connect, at the second time, the second component to the output.

17. The method of claim 13, wherein:
the first component comprises an amplifier; and
the second component comprises an amplitude attenuator.

18. The method of claim 13, wherein:
the first portion of the analog signal represents a first portion of a preamble of a data packet;
the second portion of the analog signal represents a second portion of the preamble of the data packet; and
the third portion of the analog signal represents a payload of the data packet.

19. The method of claim 13, wherein the second component comprises a variable amplitude attenuator,
further comprising:
based at least in part on the second power level, causing the variable amplitude attenuator to set a first impedance value; and
wherein the switching component connects the second input to the output such that the third portion of the analog signal passes through the variable amplitude attenuator.

20. The method of claim 13, wherein the third portion represents a payload of a first packet, further comprising:
receiving an indication that a second preamble of a second packet has been received; and
based at least in part on receiving the indication, causing the switching component to connect the first component to the output of the switching component.

* * * * *